United States Patent

Ochiai et al.

[11] 3,892,737
[45] July 1, 1975

[54] CEPHALOSPORINS

[75] Inventors: Michihiko Ochiai, Senriyamahigashi; Osami Aki, Kawanishi; Akira Morimoto, Yamadashimo; Taiiti Okada, Kyoto, all of Japan

[73] Assignee: Takeda Chemical Industries, Ltd., Japan

[22] Filed: Aug. 18, 1972

[21] Appl. No.: 281,656

[30] Foreign Application Priority Data
Aug. 20, 1971  Japan.............................. 46-63448
Oct. 25, 1971  Japan.............................. 46-84522

[52] U.S. Cl.............................. 260/243 C; 424/246
[51] Int. Cl............................................ C07d 99/24
[58] Field of Search ............................ 260/243 C

[56] References Cited
FOREIGN PATENTS OR APPLICATIONS
6,916,151  4/1971  Netherlands Primary Examiner—Nicholas S. Rizzo
Attorney, Agent, or Firm—Craig & Antonelli

[57] ABSTRACT

A novel cephalosporin compound of the formula:

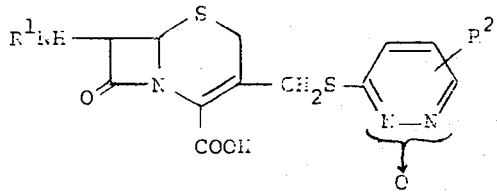

wherein $R^1$ is a hydrogen atom or an acyl group and $R^2$ is a hydrogen atom, a halogen atom, an alkyl or an alkoxy group, or a pharmaceutically acceptable salt thereof, for example, sodium 7-(2'-thienylacetamido)-3-[6''-(3''-methylpyridazinyl)thiomethyl]-3-cephem-4-carboxylate 2''-oxide, is provided. This cephalosporin compound has a broad antimicrobial spectrum and particularly effective against such bacteria as *Proteus morganii* or *Proteus vulgaris*.

39 Claims, No Drawings

CEPHALOSPORINS

This invention relates to cephalosporin compounds and preparation thereof. More particularly, this invention relates to cephalosporin compounds, i.e. 3-pyridazinylthiomethyl cephalosporins, represented by the following formula:

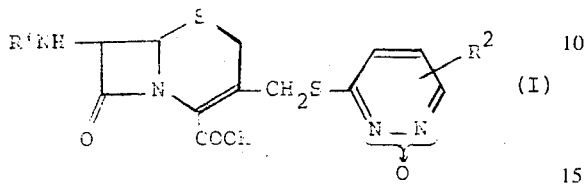

wherein $R^1$ represents a hydrogen atom or an acyl group and $R^2$ represents a hydrogen atom, a halogen atom, an alkyl group or an alkoxy group, or pharmaceutically acceptable salts thereof, and to a process for producing the same.

As the investigations concerning synthetic cephalosporin derivatives, there have heretofore been made various attempts such as conversion of the 5-amino-5-carboxyvaleryl group at the 7-position of cephalosporin C into various acyl groups and/or conversion of the acetoxy group at the 3-position thereof into various substituents in order to synthesize compounds having a broad antimicrobial spectrum or a specific antimicrobial spectrum. None of them, however, proved to be effective against *Proteus morganii*, which is a species of bacteria causing urinary infection, or *Pseudomonas aeruginosa*.

The present inventors have found that cephalosporins having a pyridazinylthiomethyl group at the 3-position exhibit strong antimicrobial activity against *Proteus morganii* and *Proteus vulgaris*, against which cephalosporins and penicilins of prior art are less effective. They have also found that said cephalosporins show an excellent antimicrobial ability against a broad range of bacteria and are extremely stable.

They have further found that said cephalosporins once taken are readily introduced into bile to be prominently effective against bilary infection.

The cephalosporin derivatives and salts thereof may be prepared by the per se known methods. For example, they may be produced by allowing the cephalosporanic acids represented by the following formula:

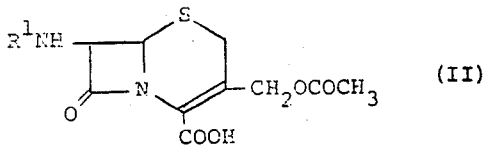

wherein $R^1$ is as defined above, or salts thereof to react with pyridazinethiol N-oxide compounds represented by the following formula:

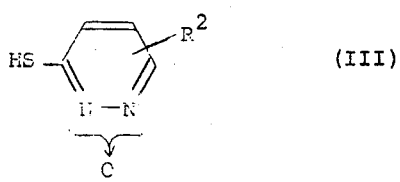

wherein $R^2$ is as defined above, or salts thereof. Alternatively, they may be produced by acylating 7-aminocephalosporin derivatives represented by the following formula:

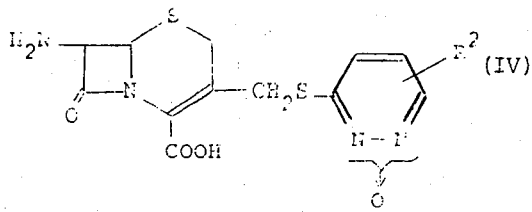

wherein $R^2$ is as defined above, salts thereof or easily decomposable esters thereof.

Preparation of 3-pyridazinylthiomethyl cephalosporins (I) by allowing cephalosporanic acids (II) to react with pyridazinethiol N-oxide compounds (III):

In the cephalosporanic acid (II) used in this reaction, $R^1$ may be selected from the groups which can play a role as N-acyl group in cephalosporins and penicillins. There may be, for example, be preferably counted 5-amino-5-carboxyvaleryl or 5-acylamino derivative thereof, thienylacetyl, phenylglycyl or N-acyl derivative thereof, α-carboxyphenylacetyl, pyridylthioacetyl, phenoxyacetyl, phenylacetyl, cyclohexenylglycyl, cyanoacetyl, tetrazolylacetyl, pyrazolylacetyl, 4-acylaminomethylphenylacetyl, 3,5-dimethylpyrazolylacetyl, etc. That is, said acyl groups may be inclusive of the groups of the formula:

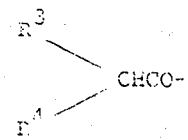

wherein $R^3$ represents phenyl, phenoxy, 1-cyclohexenyl, thienyl, 3-amino-3-carboxypropyl, or substituted or unsubstituted pyrazolyl group, and $R^4$ represents a hydrogen atom or an amino group.

On the other hand, $R^2$ in the other starting material (III) may be a halogen atom such as chlorine or bromine, an alkyl group such as methyl, ethyl or propyl, or an alkoxy group such as methoxy, ethoxy, propyloxy, butyloxy, or octyloxy. The oxide group, as shown in the formula (III), is bonded to either one of nitrogen atoms in the pyridazine nucleus.

This reaction is desirably conducted in a suitable solvent. As such a solvent, there can be used water or heavy water or an organic solvent which is easily miscible with water and does not react with the starting materials. Examples of organic solvents to be used are dimethylformamide, dimethylacetamide, dioxane, acetone, alcohol, acetonitrile, dimethylsulfoxide, tetrahydrofuran and the like. The reaction temperature and the reaction time are varied with the starting materials and/or the solvents used. Generally, however, the reaction is carried out at 0° to 100°C for several hours to several days. The reaction is effected around neutral pH, i.e. at pH 2 to 8, preferably at pH 5 to 8. Meanwhile, in order to prevent the starting material pyridazinethiol N-oxide from being oxidized, the reaction is advantageously conducted in an atmosphere of an inert gas such as nitrogen. The aimed product thus obtained can be refined, by various methods according to the properties thereof, for example, column chromatography, extraction, precipitation, countercurrent distribution, recrystallization, etc.

Preparation of 3-pyridazinylthiomethyl cephalosporins (I) by acylating 7-aminocephalosporin derivatives (IV):

The 7-aminocephalosporin derivatives (IV) provide easily various kinds of cephalosporins through ordinary acylation reactions. The carboxyl group at the 4-position may be in the form of salts of alkali, alkaline earth metals or organic amines, for example, sodium, potassium, magnesium, calcium, aluminum, triethylamine, etc. Alternatively, it may be in the form of easily decomposable esters with, for example, β-methylsulfonylethyl, trimethylsilyl, benzhydryl-β, β, β-trichloroethyl, phenacyl, p-methoxybenzyl, p-nitrobenzyl, etc. As acylating agents used for acylation, there can be used organic carboxylic acids or functional derivatives thereof, including all of the acylating agents usable in acylation of penicillins and cephalosporins. Among these organic carboxylic acids, acetic acid derivatives are particularly preferred. That is, acetic acid derivatives, having at α-position a phenyl, phenoxy, thienyl, cyclohexenyl group or a group among these groups having such substituents as lower alkyl groups, halogen atoms, nitro or amino groups are preferably used. Furthermore, acetic acid derivatives, having at α-position other than the above groups amino, carboxy, sulfo group or a group derived from these groups, are also preferably used. Examples of these organic carboxylic acids are phenylglycine, phenylmalonic acid, phenylacetic acid, para-nitrophenylacetic acid, cyclohexenylglycine, trimethyl cyclohexenylglycine, thienylacetic acid, pyridylthioacetic acid, phenoxyacetic acid, α-phenoxypropionic acid, α-phenoxybutyric acid, 2,6-dimethoxybenzoic acid, 5-methyl-3-phenyl-4-isoxanolylcarboxylic acid, 3-o-chlorophenyl-5-methyl-4-isoxazolyl carboxylic acid, etc.

These organic carboxylic acids may be provided for acylation reaction, either in the form of free acids, salts of sodium, potassium, calcium, trimethyl amine, pyridine, etc. or functional derivatives thereof such as acid halides, acid anhydrides, mixed acid anhydrides, active amides or esters. Typical examples which are most frequently used are acid chlorides, alkyl carbonic acid anhydrides, aliphatic carboxylic acid mixed anhydrides, or acid azolides.

When organic carboxylic acids are used in the form of free acids or salts, suitable condensing agents are used. The condensing agents are, for example, N,N'-disubstituted carbodiimides such as N,N'-dicyclohexyl carbodiimide, azolide compounds such as N,N'-carbonyl imidazole or N,N'-thionyl diimidazole, N-ethoxy carbonyl-2-ethoxy-1,2-dihydro quinoline, or dehydrating agents such as phosphoryl oxychloride or alkoxy acetylene. When these condensing agents are used, the reaction is considered to proceed via functional derivatives of carboxylic acids.

This reaction is usually carried out advantageously and smoothly in a solvent. As a solvent, any conventional solvent or a mixture thereof may be usable, so long as it does not interefere with the reaction of the present invention. It may include water, acetone, tetrahydrofuran, dioxane, acetonitrile, chloroform, dichloromethane, dichloroethylene, pyridine, dimethyl aniline, dimethylformamide, dimethylacetamide, dimethyl sulfoxide and the like. The reaction temperature is not so critical. Usually, however, the reaction is conducted under cooling or at room temperature. The reaction products can be isolated by such a purification method as column chromatography, extraction, isoelectric point precipitation, countercurrent distribution, recrystallization, etc.

In the above acylation reaction, the intermediate compound, e.g. imide halide or imino ether, formed in the course of the deacylation reaction described above may be allowed to react with the acylating agents. This is also within the scope of the present invention.

Preparation of 7-aminocephalosporin derivatives (IV) by deacylating 3-pyridazinylthiomethyl-7-aminocephalosporins:

If $R^1$ in the 3-pyridazinylthiomethyl cephalosporins (I) obtained is an acyl group, the compounds, i.e. 3-pyridazinylthiomethyl-7-acylamino cephalosporins may be led through deacylation reaction to 3-pyridazinylthiomethyl-7-aminocephalosporins. This reaction is particularly useful for obtaining 7-amino 3-(6'-pyridazinylthiomethyl)-3-cephem-4-carboxylic acid oxides (IV) by deacylating 5-amino-5-carboxyvaleryl group at the 7-position of 7-(5'-amino-'-carboxyvalerylamido)-3-(6''-pyridazinylthiomethyl)-3-cephem-4-carboxylic acid oxides obtainable from cephalosporin C. Of course, the reaction may also be applied to compounds containing other acyl groups.

Said 7-acylamino cephalosporins used in this deacylation reaction may be used either in the form of free acids, salts of alkali or alkaline earth metals, for example, sodium, potassium, magnesium, aluminum, etc. or in the form protected at amino or carboxyl groups thereof. As a group for the protection of the amino group, any protective group conventionally used for the protection of an amino group may be used. For example, benzyloxycarbonyl, methoxycarbonyl, t-butyloxycarbonyl, i-butyloxycarbonyl, isobornyloxycarbonyl or nitrobenzoyl group may be often used. As a protective group for the carboxylic group, any protecting group for carboxylic acids is generally used. Among these, those which can easily be removed are particularly preferred. For example, easily decomposable benzhydryl, nitrobezyl, benzyl, β-methylsulfonylethoxy or trimethyl silyl esters are conveniently used.

This deacylation reaction is conducted under the reaction conditions which are generally applied for obtaining 7-aminocephalosporanic acids through cleavage of acyl amino bonds at the 7-position of the cephalosporin C. For example, 7-acylamino cephalosporins of which the side chain amino groups are not protected are allowed to react with nitrosation reagents. Then the reaction products are decomposed in a protonic solvent such as water, lower alkanols e.g. methanol, ethanol, propanol, etc. The nitrosation reagents are exemplified nitrosyl halides such as nitrosyl chloride or nitrosyl bromide, nitrous acid, nitrous acid aliphatic alcohols, nitrogen dioxide or nitrosyl sulfate. This reaction is ordinarily conducted in a solvent. Fatty acids such as formic acid or acetic acid are often used. Mixed solvents of these fatty acids with other organic solvents, for example, benzene, toluene, xylene, nitromethane, nitroethane, 1-nitro propane, nitrobenzene, dichloromethane, chloroform, tetrahydrofuran, etc. may also be used. Although the reaction temperature is not limited, the reaction is preferably carried out under cooling in order to avoid side reactions. The reaction products are directly hydrolyzed without isolation. From the solution of the hydrolyzed products thus obtained, 7-aminocephalosporin derivatives (IV) are obtained.

On the other hand, among 7-acylamino cephalosporins, whose side chain amino groups are protected or whose acyl groups contain no amino group, are treated with imide halide-forming reagents. The imide halides obtained thereby are then converted through exchange reaction into imino ethers, which are thereafter subjected to hydrolysis. As imide halide-forming reagents, halides containing carbon, phosphor or sulfur or acid halides derived from oxyacids containing any of these elements can be used. Examples are phosphoryl oxychloride, phosphoric pentachloride, phophoric trichloride, thionyl chloride, phosgene, oxalylchloride, pyrocartechlophosphoric trichloride, etc. Imide halide forming reactions are advantageously conducted in the presence of tertiary amines such as triethyl amine, pyridine, dimethyl aniline, etc. After imide halide-formation is completed, an alcohol is added to the reaction system, whereby corresponding imino ethers are easily obtained. The reactions just mentioned above are preferably conducted under cooling in order to avoid undesirable side reactions. As alcohols to be used for imino ether formation, lower alkanols such as methanol or ethanol are preferably used. The imino ethers thus prepared are then allowed to react with water to effect hydrolysis to give 7-aminocephalosporin derivatives (IV). Said hydrolysis can be smoothly carried out by addition of an acid such as formic acid or acetic acid. After hydrolysis is completed, the reaction system is adjusted to pH 3.5 to 4.0.

Preparation of pyridazinethiol N-oxide compounds (III):

The pyridazinethiol N-oxide compounds (III), which may be used as one of the starting materials in the present invention, may be prepared by allowing the corresponding halogen substituted compound of the formula:

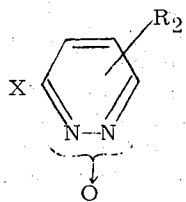

wherein $R^2$ is the same as defined above and X denotes a halogen atom, to react directly with thiolation agents according to per se conventional methods or to react with thiourea to form intermediate thiuronium salt which is further decomposed with alkali. The compound (V) wherein X is chlorine may directly be allowed to react with thiolation agents in a sealed vessel to prepare said compound (III). The last method can be practiced advantageously and smoothly in a solvent by the use of thiolation agents such as sodium sulfide, potassium sulfide, sodium hydrosulfide, potassium hydrosulfide, etc. As a solvent, any solvent including water, organic solvents or mixtures thereof, is usable so long as it does not interfere with the reaction. As organic solvents, alcohols such as methanol, ethanol or propanol, ethers such as tetrahydrofuran or dioxane, or ketones such as acetone or methyl ethyl ketone may be used. Furthermore, acetonitrile, dimethylformamide or dimethylsulfoxide may also be used. This reaction is conducted in a sealed vessel and proceeds smoothly at a temperature ranging from 90° to 150°C, preferably from 100° to 120°C. The reaction time may be variable depending on the starting materials, thiolation agents, or solvents used. Usually, however, the reaction is substantially completed in the range from several hours to 20 hours. If an inert gas such as nitrogen gas is sealed into the sealed vessel, favorable results may be obtained.

The cephalosporins obtained according to the present invention may be used as, for example, in the form of injection or capsule similarly to the well-known cephalosporins. They have strong antimicrobial activity against a broad range of bacteria, including *Proteus morganii*, etc. against which the penicillins or cephalosporins of prior art are less effective. For example, when 7-(2'-thienylacetamido)-3-[6''-(3''-methoxypyridazinylthiomethyl)]-3-cephem-4-carboxylic acid 1''-oxide is used, an aqueous solution containing 0.1 to 6 g. of this compound is usually injected hypodermically per adult per day. On the other hand, in case of 7-(D-2'-amino-2'-phenylacetamido)-3-[6''-(3''-methoxypyridazinylthiomethyl)]-3-cephem-4-carboxylic acid 1''-oxide, 0.25 to 6 g. is usually administered orally per adult.

It is to be understood that the following examples are solely for the purpose of illustration and not to be construed as limitations of this invention, and that many variations may be resorted to without departing from the spirit and scope of this invention. In this specification, "g.", "mg.", "ml.", "mcg.", "m.p." and "decomp." are "gram(s)", "milligram(s)", "milliliter(s)", "microgram(s)", "melting point" and "decomposed", respectively. Temperatures are all uncorrected, and percentages are all on the weight basis. "MIC" means minimum inhibitory concentration. "Part" means "weight part" unless otherwise specified, and the relationship between "part(s)" and "part(s) by volume" corresponds to that gram(s) and milliliter(s).

EXAMPLE 1

3.12 Grams of 6-methoxy-3-chloropyridazine 2-oxide is dissolved in 100 ml dioxane. Into this solution is added 5.76 g. of $Na_2S \cdot 9H_2O$ dissolved in 100 ml. of water. The entire solution is introduced into a stainless autoclave of 300 ml. capacity. After the air in the vessel is replaced with nitrogen gas, the autoclave is sealed, followed by heating at a temperature ranging from 100° to 110°C under stirring for 15 hours. Then, the reaction mixture is subjected to distillation under reduced pressure to remove most part of dioxane. The remainder is subjected to filtration to remove insolubles. To the filtrate is added 1N-hydrochloric acid under ice-cooling to make the solution acidic. The precipitates formed are collected by filtration to obtain 2.00 g. of 6-methoxy-3-pyridazinethiol 2-oxide. m.p.: 140°C Elementary analysis: Calculated for $C_5H_6N_2O_2S$: C, 37.98; H, 3.82; N, 17.71. Found: C, 37.98; H, 3.52; N, 18.01.

| MIC (γ/ml.) | |
|---|---|
| *Staphylococcus aureus* | 5 |

-Continued

MIC (γ/ml.)
| | |
|---|---|
| Bacillus subtilis | 10 |
| Sarcina lutea | 10 |

EXAMPLE 2

4.05 Grams of 6-n-butoxy-3-chloropyridazine 2-oxide and 6.0 g. of $Na_2S \cdot 9H_2O$ are added to a mixture of 50 ml. of water and 50 ml. of dioxane. The mixture is heated for 12 hours in the same manner as in Example 1. The reaction product is treated in a similar manner to Example 1 to obtain 2.28 g. of 6-n-butoxy-3-pyridazinethiol 2-oxide. m.p.: 47° to 49°C Elementary analysis: Calculated for $C_8H_{12}O_2N_2S$: C, 47.98; H, 6.04; N, 13.99. Found: C, 47.67; H, 5.86; N, 13.29.

MIC (γ/ml.)
| | |
|---|---|
| Staphylococcus aureus | 5 |
| Bacillus subtilis | 5 |
| Escherichia coli NIHJ | 5 |

EXAMPLE 3

A solution of 1.34 g. of potassium hydroxide in 100 ml. of ethanol is saturated with hydrogen sulfide to prepare an ethanolic solution of potassium hydrosulfide. To this solution are added 3.2 g. of 6-methoxy-3-chloropyridazine 2-oxide to effect reaction similarly as in Example 1 to obtain 1.98 g. of 6-methoxy-3-pyridazinethiol 2-oxide.

EXAMPLE 4

4.13 Grams of 6-(2-ethylhexyloxy)-3-chloropyridazine 2-oxide and 4.60 g. of $Na_2S \cdot 9H_2O$ are dissolved in a mixture of 50 ml. each of water and dioxane. The reaction is similarly conducted as in Example 1 to obtain 2.78 g. of 6-(2-ethylhexyloxy)-3-pyridazinethiol 2-oxide.

Elementary analysis: Calculated for $C_{12}H_{10}N_2O_2S$: C, 56.23; H, 7.87; N, 10.93. Found: C, 56.17; H, 7.52; N, 10.17.

EXAMPLE 5

To a solution of 2.0 g. of 6-ethoxy-3-chloropyridazine 2-oxide in 50 ml. of water, is added 3.60 g. of $Na_2S \cdot 9H_2O$ dissolved in 50 ml. of water. The solution is introduced into a pressure bomb. After replacement of the inner air with nitrogen, the reaction mixture is heated at 120° to 130°C for 15 hours under stirring. The reaction product is similarly treated as in Example 1 to obtain 1.52 g. of 6-ethoxy-3-pyridazinethiol 2-oxide. m.p.: 98° to 99°C Elementary analysis: Calculated for $C_6H_8N_2O_2S$: C, 46.85; H, 4.68; N, 16.27. Found: C, 42.07; H, 4.63; N, 15.83.

EXAMPLE 6

A solution of 3 g. of potassium hydroxide in 30 ml. of methanol is saturated with hydrogen sulfide to prepare a methanolic solution of potassium hydrosulfide. To this solution are added 1.9 g. of 3-chloro-6-methylpyridazine 1-oxide. The mixture is then introduced into an autoclave and after replacement of the air with nitrogen heated with stirring at 130° to 140°C for 12 hours. The reaction mixture is treated similarly as in Example 1 to obtain 1.2 g. of 6-methyl-3-chloro-6-methylpyridazine 1-oxide. This product is oxidized under mild conditions to give the corresponding disulfide. m.p.: 205° to 207°C Elementary analysis: Calculated for $C_{10}H_{10}N_4O_2S_2$: C, 42.56; H, 3.57; N, 19.85. Found: C, 42.71; H, 3.50; N, 20.00.

EXAMPLE 7

To a solution of 1 g. of 3,6-dichloropyridazine 1-oxide in 50 ml. of dioxane, is added 4.35 g. of $Na_2S \cdot 9H_2O$ dissolved in 50 ml. of water. The entire solution is introduced into a stainless autoclave of 300 ml. capacity. After the air is replaced with nitrogen gas, the autoclave is sealed, followed by heating at room temperature for 10 hours under stirring. The reaction mixture is condensed under reduced pressure. To the residue is added 10 ml. of water and insoluble substances are removed by filtration. The filtrate is made acidic by addition of 10% hydrochloric acid. The resulting precipitates are collected by filtration to obtain 0.71 g. of 6-chloro-3-pyridazinethiol 2-oxide. m.p.: 74° to 76°C Elementary analysis: Calculated for $C_4H_3ON_2SCl$: C, 29.55; H, 1.86; N, 17.23. Found: C, 29.31; H, 1.65; N, 16.84.

EXAMPLE 8

A solution of 2.2 g. of potassium in 30 ml. of methanol, is saturated with hydrogen sulfide and to the resulting solution are added 1.3 g. of 3-chloropyridazine 1-oxide. The mixture is introduced into a stainless autoclave and after replacement of inner air with nitrogen gas, the autoclave is sealed, followed by heating at 130° to 140°C for 1 hour. The reaction mixture is concentrated under reduced pressure, 10 ml. of water are added to the residue and the solution is filtered. To the filtrate is added 1 N-HCl to make the solution acidic. The solution is then extracted with ethyl acetate. From the ethyl acetate layer are obtained 0.384 g. of 6-pyridazinethiol 2-oxide.

EXAMPLE 9

A solution of 600 parts of sodium 7-aminocephalosporanate and 400 parts of sodium 6-methoxy-3-pyridazinethiol 2-oxide in 7000 parts by volume of water is heated at 42°C for 30 hours while blowing nitrogen gas into the reaction system. The reaction solution is passed through a polystyrene resin (Amberlite XAD-II, trade name of Rohm & Haas Co.) columns to have the reaction product adsorbed on the resin. The product is eluted with water. 173 Parts of sodium 7-amino-3-[6'-(3'-methoxypyridazinylthiomethyl)]-3-cephem-4-carboxylate 1'-oxide is obtained.

Elementary analysis: Calculated for $C_{13}H_{13}N_4O_5S_2 \cdot Na \cdot 2H_2O$: C, 36.45; H, 4.00; N, 13,06. Found: C, 36,80; H, 3.74; N, 12.73.

NMR absorption spectrum ($D_2O$, 100 MC): 3.78 ppm (quartet of methylene protons at the 2-position); 4.16 ppm (singlet of methoxy proteon); 4.38 ppm (quartet of methylene protons at the 3-position); 4.92 ppm, 5.19 ppm (doublets of protons at the 6- and 7-positions, respectively); 7.27, 8.08 ppm (AB type absorption of protons on pyridazine ring)

EXAMPLE 10

A solution of 2.72 parts of sodium 7- aminocephalosporanate and 2.00 parts of sodium 6-methoxy-3-pyridazinethiol 2-oxide in 100 parts by volume of water is heated at 40°C for 30 hours while blowing nitrogen gas into the reaction system. After the reaction mixture is cooled, insoluble substances are removed by filtration from the reaction products. The filtrate is adjusted to pH 2 by addition of dilute hydrochloric acid. The precipitates are collected by filtration and, washed with water and further with a small amount of chloroform. 2.38 Parts of 7-amino-3-[6'-(3'-methoxypyridazinylthiomethyl)]-3-cephem-4-carboxylic acid 1'-oxide is obtained. The sodium salt derived from this product is completely identical with the product obtained in Example 9.

EXAMPLE 11

A solution of 840 parts of sodium 7-(2-thienylacetamido) cephalosporanate and 400 parts of sodium 6-methoxy-3-pyridazinethiol 2-oxide in 10,000 parts by volume of heavy water is heated at 50°C for 40 hours while blowing nitrogen gas into the reaction system. The reaction mixture, which is cooled and separated from insoluble substances by filtration, is adjusted to pH 2. The resulting precipitates are collected by filtration, washed and dried to obtain 779 parts of 7-(2'-thienylacetamido)-3-[6''-(3''-methoxypyridazinylthiomethyl)]-3-cephem-4-carboxylic acid 1''-oxide.

Elementary analysis: Calculated for $C_{19}H_{18}O_6N_4S_3$: C, 46.14; H, 3.66; N, 11.32; S, 19.45. Found: C, 45.36; H, 3.32; N, 10.99; S, 19.19.

NMR spectrum (heavy dimethylsulfoxide, 100 MC): 3.59 ppm (quartet of methylene proton at the 2-position); 3.70 ppm (singlet of methylene proton at the 2-position on thiophene ring); 3.87 ppm (singlet of methoxy proton); 4.16 ppm (singlet of methylene proton at the 3-position); 5.04, 5,59 ppm (doublet and quartet of protons at 6- and 7-positions, respectively); 6.82, 7.86 ppm (AB type of protons on pyridazine ring); 6.88, 7.26 ppm (multiplets of protons on thiophene ring); 9.04 ppm (doublet of NH proton)

MIC (meg./ml.)

| | |
|---|---|
| Staphylococcus aureas 209P | <0.01 |
| Staphylococcus aureus No. 87 | 2 |
| Bacillus subtilis PCI 219 | 0.05 |
| Sarcina lutea PCI 1001 | 0.05 |
| Escherichia coli NIHJ | 0.5 |
| Klebsiella pneumoniae Kbl | 2 |
| Proteus vulgaris Eb 51 | 5 |

EXAMPLE 12

A solution of 225 parts of sodium 7-(5'-amino-5'-carboxyvalerylamido)cephalosporanate and 100 parts of 6-methoxy-3-pyridazinethiol 2-oxide in 2,000 parts by volume of heavy water is heated under stirring at 50°C for 24 hours while blowing nitrogen gas into the reaction system. After cooling, the reaction is passed through a polystyrene resin (Amberlite XAD-II) column to have the reaction product absorbed on the resin. The product is eluted with water. 214 Parts of sodium 7-(5'-amino-5'-carboxyvalerylamido)-3-[6''-(3''-methoxypyridazinylthiomethyl)]-3-cephem-4-carboxylate 1''-oxide is obtained.

Elementary analysis: Calculated for $C_{19}H_{22}N_5O_8S_2$·Na·2H$_2$O: C, 39.93; H, 4.59; N, 12.25. Found: C, 39.75; H, 5.39; N, 12.17.

NMR spectrum (D$_2$O, 100 MC); 3.80 ppm (quartet of methylene proton at the 2-position; 4.18 ppm (singlet of methoxy proton); 4.34 ppm (quartet of methylene proton at the 3-position); 5.28, 5.79 ppm (doublets of protons at 6- and 7-positions, respectively); 7.28, 8.12 ppm (AB type absorption of protons on pyridazine ring)

EXAMPLE 13

To a solution of 500 parts of 7-amino cephalosporanic acid and 155 parts of sodium hydrogen carbonate in 5,000 parts by volume of water is added 410 parts of 6-n-butoxy-3-pyridazinethiol 2-oxide. The reaction is effected at 40°C for 20 hours under stirring. The resulting precipitates are separated by centrifuge and washed with water, alcohol and ether, respectively, to obtain 197 parts of sodium 7-amino-3-[6'-(3'-n-butoxypyridazinylthiomethyl)]-3-cephem-4-carboxylate 1'-oxide.

NMR spectrum (trifluoro acetic acid, 100 MC): 1.00 ppm (triplet of methyl proton); 3,80 ppm (quartet of methylene proton at the 2-position); 4.40 ppm (triplet of methylene proton adjacent to oxygen of n-butoxy group); 4.57 ppm (quartet of methylene proton at the 3-position); 5.36 ppm (quartet of protons at 6- and 7-positions); 7.25, 8.03 ppm (AB type absorption of protons on the pyridazine ring)

EXAMPLE 14

A solution of 500 parts of sodium 7-(2-thienylacetamido)cephalosporanate and 266 parts of 6-n-butoxy-3-pyridazinethiol 2-oxide in 5,000 parts by volume of water is heated at 50°C for 24 hours under stirring. The precipitates are collected by filtration and washed to obtain 415 parts of sodium 7-(2'-thienylacetamido)-3-[6''-(3''-n-butoxypyridazinylthiomethyl)]-3-cephem-4-carboxylate 1'-oxide.

NMR spectrum (heavy dimethylsulfoxide, 100 MC): 0.92 ppm (triplet of methyl proton at the terminal of n-butyl group); 3.45 ppm (broad singlet of methylene proton at the 2-position); 3.75 ppm (singlet of methylene proton at the 2-position on thiophene ring); 4.91, 5.44 ppm (doublet and quartet of protons at 6- and 7-positions, respectively); 6.76, 8.38 ppm (AB type absorption of protons on pyridazine ring); 6.80 to 7.40 ppm (multiplet of protons on thiophene ring)

MIC (meg/ml.)

| | |
|---|---|
| Staphylococcus aureus 209P | 0.02 |
| Staphylococcus aureus No. 87 | 0.1 |
| Bacillus subtilis PCI 219 | 0.05 |
| Sarcina lutea PCI 1001 | 0.05 |
| Escherichia coli NIHJ | 1 |
| Klebsiella pneumoniae Kbl | 5 |

EXAMPLE 15

A solution of 294 parts of sodium 7-aminocephalosporanate and 278 parts of sodium 6-(2-ethylhexyloxy)-3-pyridazinethiol 2-oxide in 5,000 parts by volume of water, is heated under stirring at 40°C for 20 hours. The precipitates are collected by filtration and washed with water to obtain 140 parts of sodium 7-amino-3-{6'-[3''-(2''-ethyl)hexyloxy pyridazinylthiomethyl]}-3-cephem-4-carboxylate 1'-oxide.

Elementary analysis: Calculated for $C_{20}H_{27}N_4O_5S_2Na$: C, 48.96; H, 5.54; N, 11.42. Found: C, 49.57; H, 5.82; N, 11.60.

NMR spectrum (trifluoro acetic acid, 100 MC): absorption of protons of 2-ethylhexyl group; 3.82 ppm (quartet of methylene proton at the 2-position); 4.51 ppm (quartet of methylene proton at the 3-position); 5.34 ppm (quartet of protons at 6- and 7-position); 7.22, 8.02 ppm (AB type absorption of protons on pyridazine ring)

EXAMPLE 16

A solution of 418 parts of sodium 7-(2-thienylacetamido)cephalosporanate and 278 parts of sodium 6-(2-ethylhexyloxy)-3-pyridazinethiol 2-oxide in 5,000 parts by volume of water, is heated under stirring at 50°C for 24 hours. After the reaction mixture is cooled, the precipitated oily substances are separated therefrom. Said oily substances are dissolved in water and the solution is adjusted to pH 2, which is then extracted with ethyl acetate. After the ethyl acetate layer is washed with water and dried, sodium 2-ethyl hexanoate is added thereto. The precipitates are collected by filtration to obtain 410 parts of sodium 7-(2'-thienylacetamido)-3-{6''-[3''-(2'''-ethyl)hexyloxy pyridazinylthiomethyl]} -3-cephem-4-carboxylate 1''-oxide.

Elementary analysis: Calculated for $C_{26}H_{31}N_4O_6S_3Na.H_2O$: C, 49.35; H, 5.26; N, 8.85. Found: c, 49.38; H, 5.40; N, 8.03.

NMR spectrum (heavy dimethylsulfoxide, 100 MC): absorptions of protons based on 2-ethylhexyl group; 3.45 ppm (broad singlet of methylene proton at the 2-position); 3.45 ppm (singlet of methylene proton at the 2-position of thiophene ring); 4.23 ppm (quartet of methylene proton at the 3-position); 4.90, 5.42 ppm (doublets of methylene protons at 6- and 7-positions, respectively); 6.71, 8.42 ppm (AB type absorption of protons on thiophene ring); 6.80 to 7.30 (multiplet of protons on thiophene ring; 8.93 ppm (doublet of NH proton)

MIC (mcg/ml.)
| | |
|---|---|
| Staphylococcus aureus 209P | 0.02 |
| Staphylococcus aureus No. 87 | 0.2 |
| Bacillus subtilis PCI 219 | 0.05 |
| Sarcina lutea PCI 1001 | 0.1 |

EXAMPLE 17

To a mixture of three parts of 7-(5'-carboxy-5'-isobornyloxycarbonylaminovalerylamino)-3-[6''-(3''-methoxypyridazinylthiomethyl)]-3-cephem-4-carboxylic acid 1''-oxide and 100 parts of dichloromethane, are further added 5 parts of pyridine and 10 parts of trimethylchloro silane. The mixture is stirred at room temperature for ten minutes. The reaction products are thereafter cooled to 10°C and stirred for 20 minutes with addition to 10 parts of pyridine and 7 parts of phosphoric pentachloride to form imide halide. The reaction mixture is further cooled to −20°C and 125 parts of methanol are added thereto to prepare imino ether. The reaction mixture is then warmed to room temperature and 20 parts of a 25% aqueous formic acid solution are added thereto. This mixture is adjusted to pH 3.5 to 4.0 with addition of triethylamine. The resulting precipitates are collected by filtration to obtain 7-amino-3-[6'-(3'-methoxypyridazinylthiomethyl)]- 3-cephem-4-carboxylic acid 1'-oxide. This product is completely identical with that obtained in Example 10.

EXAMPLE 18

2.5 Parts of sodium 7-(5'-carboxy-5'-aminovalerylamino)-3-[6''-(3''-methoxypyridazinylthiomethyl)]-3-cephem-4-carboxylate 1''-oxide are dissolved in 7.5 parts of 99% formic acid under cooling with ice. To this solution is added a solution of 0.6 part of nitrosyl chloride dissolved in 2.3 parts of formic acid. After 5 minutes, the reaction mixture is condensed under reduced pressure. 7 Parts of water are added to the residue and the mixture is adjusted to pH 3.5 to 4.0 with addition to an aqueous sodium hydroxide solution under cooling with ice. The resulting precipitates are collected by filtration to obtain 7-amino-3-[6''-(3'-methoxypyridazinylthiomethyl)]-3-cephem-4-carboxylic acid 1''-oxide.

EXAMPLE 19

To a mixture of four parts of sodium 7-(2'-thienylacetamido)-3-[6''-(3''-butoxypyridazinylthiomethyl)]-3-cephem-4-carboxylate 1''-oxide and 200 parts of dichloromethane, are added 4 parts of pyridine and 8 parts of trimethylchloro silane. The mixture is stirred at room temperature for 2 hours. Then, the reaction mixture is cooled to −20°C and 9 parts of pyridine and 6 parts of phosphoric pentachloride are added thereto. After the mixture is stirred for 40 minutes, 100 parts of methanol is added to the reaction mixture. The mixture is thereafter stirred at −15°C for 30 minutes and further at room temperature for 30 minutes. To this mixture are added 16 parts of a 25% aqueous formic acid solution. By addition of triethylamine, the mixture is adjusted to pH 3.5 to 4.0. The resulting precipitates are collected by filtration to obtain 7-amino-3-[6'-(3'-butoxypyridazinylthiomethyl)]-3-cephem-4-carboxylic acid 1'-oxide.

EXAMPLE 20

To a suspension of 3.7 parts of 7-amino-3-[6'-(3'-methoxypyridazinylthiomethyl)]-3-cephem-4-carboxylic acid 1'-oxide in 60 parts of dimethylacetamide, is added 2.0 parts of 2-thienylacetate chloride. The mixture is stirred at room temperature for 3 hours. After removal of insoluble substances by filtration, dimethylacetamide is removed by distillation under reduced pressure. By addition of water to the residue, the resulting precipitates are collected by filtration and washed with chloroform to obtain 3.6 parts of 7-(2'-thienylacetamido)-3-[6''-(3''-methoxypyridazinylthiomethyl)]-3-cephem-4-carboxylic acid 1''-oxide.

EXAMPLE 21

The reaction is conducted similarly as in Example 20 by the use of 4.1 parts of 7-amino-3-[6'-(3'-butoxypyridazinylthiomethyl)]-3-cephem-4-carboxylic acid 1'-oxide and 2.0 parts of 2-thienylacetyl chloride to obtain 4.0 parts of 7-(2'-thienylacetamido)-3-[6''-(3''-butoxypyridazinylthiomethyl)]-3-cephem-4-carboxylic acid 1''-oxide.

EXAMPLE 22

The reaction is conducted similarly as in Example 20 by using 47 parts of 7-amino-3-{6'-[3'-(2''-ethyl)hexyloxy pyridazinylthiomethyl]}-3-cephem-4-carboxylic acid 1'-oxide and 2.0 parts of 2-thienylacetate chloride to obtain 4.3 parts of 7-(2'-thienylactamido)-3-{6''-[3''-(2'''-ethyl)hexyloxy pyridazinylthiomethyl]} -3-cephem-4-carboxylic acid 1''-oxide.

EXAMPLE 23

To 20 parts of tetrahydrofuran are added 3.3 parts of N-isobornyloxycarbonyl-D-phenylglycine and 1.1 parts of triethylamine, and the mixture is cooled to −10°C. Into this mixture are added dropwise 1.4 parts of isobutyl chloroformate at −6° to −10°C. After the addition is completed, the reaction mixture is brought to room temperature and stirring is continued for 30 minutes. The mixed acid anhydride solution obtained by removing by filtration the precipitates (triethylamine hydrochloride) is added to a mixture of 3.7 parts of 7-amino-3-[6'-(3'-methoxypyridazinylthiomethyl)]-3-cephem-4-carboxylic acid 1'-oxide and 200 parts of dimethylacetamide. The mixture is stirred at room temperature for 2 hours. Then, dimethylacetamide is removed by distillation under reduced pressure and the residue are dissolved in ethyl acetate. To this solution is added sodium 2-ethylhexanoate. The resulting precipitate are collected by filtration to obtain sodium 7-(2'-isobornyloxycarbonylamino-2'-phenylacetamido)-3-[6''-(3'' -methoxypyridazinylthiomethyl)]-3-cephem-4-carboxylate 1''-oxide.

EXAMPLE 24

A solution of 500 parts of sodium 7-(2'-thienylacetamido)cephalosporanate, 185 parts of 3-methyl-6-pyridazinethiol 2-oxide and 110 parts of sodium hydrogen carbonate in 5,000 parts by volume of water, is heated under stirring at 40° to 50°C for 3 days. The reaction mixture is passed through a polystyrene resin (Amberlite XAD-II) column. The product is eluated with a 5% aqueous ethanol. 374 Parts of sodium 7-(2'-thienylacetamido)-3-[6''-(3''-methylpyridazinyl)-thiomethyl]-3-cephem-4-carboxylate 2''-oxide is obtained. m.p.: 175° to 178°C (decomp.)

Elementary analysis: Calculated for $C_{19}H_{17}O_5N_4S_3Na \cdot 3/2H_2O$: C, 43.26; H, 3.82; N, 10.62. Found: C, 43.13; H, 3.95; N, 11.20.

NMR spectrum (D$_2$O, 100 MC): 2.60 ppm (singlet of methyl proton on pyridazine ring); 3.6 ppm (AB type quartet of methylene proton at the 2-position); 4.32 ppm (AB type quartet of methylene proton at the 3-position); 4.02 ppm (singlet of methylene proton at the 2-position on thiophene ring); 5.17, 5.76 ppm (doublets of protons at the 6- and 7-positions, respectively, $J_{6-7}$ = 5 cps)

MIC (meg/ml.)

| | |
|---|---|
| Staphylococcus aureus 209P | <0.01 |
| Staphylococcus aureus No. 87 | 0.1 |
| Bacillus subtilis PCI 219 | 0.01 |
| Sarcina lutea PCI 1001 | 0.05 |
| Escherichia coli NIHJ | 1 |
| Klebisiella pneumoniae Kbl | 1 |
| Proteus vulgaris Eb 51 | 2 |

EXAMPLE 25

A solution of 760 parts of sodium 7-[1'-(pyrazolyl)acetamido]cephalosporanic acid, 330 parts of sodium 3-methyl-6-pyridazinethiol 2-oxide and 170 parts of sodium hydrogen carbonate in 8,000 parts by volume of water, is heated under stirring at 40°C for 20 hours. After the mixture is cooled, the reaction products are treated similarly as in Example 24 to obtain 296 parts of sodium 7-[1'-(pyrazolyl)acetamide]-3-[6''-(3''-methylpyridazinyl)thiomethyl]-3-cephem-4-carboxylate 2''-oxide. m.p.: 168° to 172°C (decomp.)

Elementary analysis:
Calculated for $C_{18}H_{17}O_5N_6S_2Na \cdot 3/2H_2O$: C, 42.26; H, 3.94; N, 16.43.
Found: C, 42.67; H, 4.10; N, 16.18.

MIC (meg./ml.)

| | |
|---|---|
| Staphylococcus aureus 209P | 0.2 |
| Staphylococcus aureus No. 87 | 1 |
| Bacillus subtilis PCI 219 | 0.05 |
| Sarcina lutea PCI 1001 | 1 |
| Escherichia coli NIHJ | 5 |
| Klebsiella pneumoniae Kbl | 5 |
| Proteus vulgaris Eb 51 | 5 |

EXAMPLE 26

A solution of 836 parts of sodium 7-(2'-thienylacetamido)cephalosporanate, 300 parts of 6-pyridazinethiol 2-oxide and 190 parts of sodium hydrogen carbonate in 9,000 parts by volume of water, is heated under stirring at 40°C for 20 hours. The reaction products are treated similarly as in Example 24 to obtain 71 parts of sodium 7-(2'-thienylacetamido)-3-[6''-(pyridazinyl)thiomethyl]-3-cephem-4-carboxylate 2''-oxide. m.p.: 174° to 2''-oxide. m.p.: 174° to 177°C (decomp.).

Elementary analysis:
Calculated for $C_{18}H_{15}O_5N_4S_3Na \cdot H_2O$: C, 42.85; H, 3.40; N, 11.11. Found: C, 43.23; H, 3.59; N, 10.59.

MIC (meg./ml.)

| | |
|---|---|
| Staphylococcus aureus 209P | <0.01 |
| Staphylococcus aureus No. 87 | 0.2 |
| Bacillus subtilis PCI 219 | <0.01 |
| Sarcina lutea PCI 1001 | 0.05 |
| Escherichia coli NIHJ | 1 |
| Klebsiella pneumoniae Kbl | 1 |
| Proteus vulgaris Eb 51 | 1 |
| Proteus mirabilis Eb 59 | 5 |

EXAMPLE 27

A solution of 761 parts of 7-[1'-(pyrazolyl)-acetamido]cephalosporanic acid, 340 parts of sodium 6-chloro-3-pyridazinethiol 2-oxide and 168 parts of sodium hydrogen carbonate in 10,000 parts by volume of water, is heated under stirring at 50°C for 40 hours. The reaction mixture is treated similarly as in Example 24 to obtain 251 parts of sodium 7-[1'-(pyrazolyl)-acetamido]-3-[6''-(3''-chloropyridazinyl)thiomethyl]-3-cephem-4-carboxylate 1''-oxide. m.p.: 175° to 177°C (decomp.)

Elementary analysis:
Calculated for $C_{17}H_{14}O_5N_6S_2ClNa \cdot 2H_2O$. C, 37.75; H, 3.35; N, 15.53.
Found: C, 37.91; H, 3.83; N, 15.55.

MIC (meg./ml.)

| | |
|---|---|
| Staphylococcus aureus 209P | 0.05 |

-Continued

MIC (meg./ml.)
| | |
|---|---|
| Staphylococcus aureus No. 87 | 1 |
| Bacillus subtilis PCI 219 | 0.5 |
| Sarcina lutea PCI 1001 | 1 |
| Escherichia coli NIHJ | 5 |
| Klebsiella pneumoniae Kb1 | 2 |

EXAMPLE 28

A solution of 627 parts of sodium 7-(2'-thienylacetamido)cephalosporanate, 290 parts of 6-chloro-3-pyridazinethiol 2-oxide and 150 parts of sodium hydrogen carbonate in 10,000 parts by volume of water, is heated under stirring at 50°C for 50 hours. The reaction mixture is treated similarly as in Example 24 to obtain 428 parts of sodium 7-(2'-thienylacetamido)-3-[6''-(3''-chloropyridazinyl)thiomethyl]-3-cephem-4-carboxylate 1''-oxide. m.p.: 175° to 178°C (decomp.)

Elementary analysis: Calculated for $C_{18}H_{14}O_5S_3Cl$-Na.½$H_2O$: C, 40.79; H, 2.85; N, 10.57. Found: C, 40.91; H, 2.99; N, 10.09.

MIC (meg./ml.)
| | |
|---|---|
| Staphylococcus aureus 209P | <0.01 |
| Staphylococcus aureus No. 87 | 0.1 |
| Bacillus subtilis PCI 219 | 0.02 |
| Sarcina lutea PCI 1001 | 0.05 |
| Escherichia coli NIHJ | <0.2 |
| Klebsiella pneumoniae Kb1 | <0.2 |
| Proteus vulgaris Eb 51 | 5 |

EXAMPLE 29

A solution of 2,090 parts of sodium 7-(2'-thienylacetamido) cephalosporanate and 860 parts of sodium 6-ethoxy-3-pyridazinethiol 2-oxide in 20,000 parts by volume of water, is heated under stirring at 50°C for 40 hours. The reaction mixture is treated similarly as in Example 24 to obtain 455 parts of sodium 7-(2'-thienylacetamido)-3-[6''-(3''-ethoxy-pyridazinyl)thiomethyl]-3-cephem-4-carboxylate 1''-oxide. m.p.: 176° to 178°C (decomp.)

Elementary analysis: Calculated for $C_{20}H_{19}O_6N_4S_3$-Na.$H_2O$: C, 43.79; H, 3.86; N, 10.21.
Found: C, 43.67; H, 3.96; N, 9.86.

MIC (meg./ml.)
| | |
|---|---|
| Staphylococcus aureus 209P | 0.01 |
| Staphylococcus aureus No. 87 | 0.1 |
| Bacillus subtilis PCI 219 | 0.02 |
| Sarcina lutea PCI 1001 | 0.1 |
| Escherichia coli NIHJ | 1 |
| Klebsiella pneumoniae Kb1 | 1 |

EXAMPLE 30

To 20,000 parts of tetrahydrofuran are added 1,677 parts of N-isobornyloxycarbonyl-1-cyclohexenylglycine and 506 parts of triethylamine. The mixture is cooled to −10°C and 683 parts of isobutyl chloroformate is added thereto. The mixture is stirred at −10°C for 10 minutes to obtain a solution of mixed acid anhydrides. This solution is added to a solution which is prepared by dissolving 1,852 parts of 7-amino-3-[6'-(3'-methoxypyridazinyl)thiomethyl]-3-cephem-4-carboxylic acid 1'-oxide and 506 parts of triethylamine in 18,000 parts of a 50% aqueous tetrahydrofuran solution. The mixture is stirred at 5°C for 1 hour and further at room temperature for 1 hour. After elimination of tetrahydrofuran by distillation under reduced pressure, 100,000 parts of water and 300,000 parts of ethyl acetate are added to the residues. After the mixture is shaken, the aqueous layer is separated therefrom and adjusted to pH 3.0 by addition of dilute hydrochloric acid. This solution is then extracted with ethyl acetate. The ethyl acetate layer is washed and dried. After removal of ethyl acetate, 455 parts of 7-[2'-isobornyloxycarbonylamino-2'-(1''-cyclohexenyl)acetamido]-3-[6''''-(3''''-methoxypyridazinyl)thiomethyl]-3-cephem-4-carboxylic acid 1''''-oxide. This product is added to a mixture of 6,000 parts of trifluoro acetic acid and 1,500 parts of anisole. The solution is stirred at 0°C for 15 minutes and further stirred at room temperature for 45 minutes. Subsequently, 150,000 parts of dry ether are added thereto. The resulting precipitates are collected by filtration to obtain 307 parts of trifluoro acetic acid salt of 7-[2'-amino-2'-(1''-cyclohexenyl)-acetamido]-3-(6''''-(3''''-methoxypyridazinyl)thiomethyl]-3-cephem-4-carboxylic acid 1''''-oxide. 300 Parts of this salt are dissolved in 4,000 parts of 5% aqueous sodium hydrogen carbonate solution. This solution is treated according to the same method as in Example 23 by the use of a polystyrene resin column to obtain 97 parts of sodium 7-[2'-amino-2'-(1''-cyclohexenyl)-acetamido]-3-[6''''-(3''''-methoxypyridazinyl)thiomethyl]- 3-cephem-4-carboxylate 1''''-oxide. m.p.: 257° to 259°C (decomp.)

Elementary analysis:
Calculated for $C_{21}H_{24}O_6N_5S_2Na.3H_2O$: C, 43.22; H, 5.18; N, 12.00. Found: C, 43.20; H, 4.89; N, 11.53.

MIC (meg./ml.)
| | |
|---|---|
| Staphylococcus aureus 209P | 0.2 |
| Staphylococcus aureus No. 87 | 2 |
| Bacillus subtilis PCI 219 | 0.05 |
| Sarcina lutea PCI 1001 | 0.01 |
| Escherichia coli NIHJ | 10 |
| Klebsiella pneumoniae | 1.56 |

EXAMPLE 31

A solution of 1224 parts of 7-[1'-(3',5'-dimethylpyrazolyl)acetamido]cephalosporanic acid, 492 parts of sodium 3-methyl-6-pyridazinethiol 2-oxide and 252 parts of sodium hydrogen carbonate in 20,000 parts by volume of water, is heated under stirring at 50°C for 45 hours. After the solution is cooled, insoluble substances are removed by filtration. The filtrate is adjusted to pH 2.0 by addition of dilute hydrochloric acid. The precipitated substances are collected by filtration to obtain 539 parts of 7-[1'-(3',5'-dimethylpyrazolyl)acetamido]-3-[6''-(3''-methylpyridazinyl)thiomethyl]-3-cephem-4-carboxylic acid 2''-oxide. m.p.: 158° to 160°C (decomp.)

Elementary analysis: Calculated for $C_{20}H_{22}O_5N_6S.3/2H_2O$: C, 46.41; H, 4.86. Found: C, 46.51; H, 4.31.

NMR spectrum (heavy dimethylsulfoxide, 100 MC): 2.05, 2.14, 2.29 ppm (singlets of protons of methyl group, respectively); 3.64 ppm (AB type quartet of methylene proton at the 2-position); 4.20 ppm (AB type quartet of methylene proton at the 3-position); 4.70 ppm (singlet of 1-position methylene proton of pyrazolyl); 5.06 ppm (doublet of 6-position proton); 5.63 ppm (double doublets of 7-position proton)

MIC (meg./ml.)

| | |
|---|---|
| Staphylococcus aureus 209P | 0.1 |
| Staphylococcus aureus No. 87 | 0.5 |
| Bacillus subtilis PCI 219 | 0.05 |
| Sarcina lutea PCI 1001 | 2 |
| Escherichia coli NIHJ | 5 |
| Klebsiella pneumoniae Kbl | 2 |

EXAMPLE 32

A solution of 437 parts of sodium 7-[1'-(4'-chloropyrazolyl)acetamido]cephalosporanate and 200 parts of sodium 6-chloro-3-pyridazinethiol 2-oxide in 10,000 parts by volume of water, is heated under stirring at 50°C for 48 hours. The reaction mixture is treated similarly as in Example 24 to obtain 201 parts of sodium 7-[1'-(4'-chloropyrazolyl)acetamido]-3-[6''-(3''-chloropyridazinyl)thiomethyl]-3-cephem-4-carboxylate 1''-oxide. m.p.: 178° to 180°C (decomp.)

Elementary analysis:

calculated for $C_{17}H_{13}O_5N_6S_2ClNa \cdot 3/2H_2O$: C, 36.05; H, 2.85; N, 14.84. Found: C, 36.03; H, 2.62; N, 15.05.

MIC (meg./ml.)

| | |
|---|---|
| Staphylococcus aureus 209P | 0.02 |
| Staphylococcus aureus No. 87 | 0.5 |
| Bacillus subtilis PCI 219 | 0.1 |
| Sarcina lutea PCI 1001 | 0.5 |
| Escherichia coli NIHJ | 2 |
| Klebsiella pneumoniae | 1 |

EXAMPLE 33

A solution of 408 parts of 7-[1'-(3',5'-dimethylpyrazolyl)acetamido]cephalosporanic acid, 200 parts of sodium 6-methoxy-3-pyridazinethiol 2-oxide and 84 parts of sodium hydrogen carbonate in 10,000 parts by volume of water, is heated under stirring at 50°C for 40 hours. The reaction product is treated similarly as in Example 24 to obtain 160 parts of sodium 7-[1'-(3',5'-dimethylpyrazolyl)acetamido]-3-[6''-(3''-methoxypyridazinyl)thiomethyl]-3-cephem-4-carboxylate 1''-oxide. m.p.: 175° to 177°C (decomp.)

Elementary analysis: Calculated for $C_{20}H_{21}O_6N_6S_2Na$: C, 45.45; H, 4.00; N, 15.90. Found: C, 45.33; H, 4.43; N, 15.89.

MIC (meg./ml.)

| | |
|---|---|
| Staphylococcus aureus 209P | 0.1 |
| Staphylococcus aureus No. 87 | 0.5 |
| Bacillus subtilis PCI 219 | 0.2 |
| Sarcina lutea PCI 1001 | 2 |
| Escherichia coli NIHJ | 5 |
| Klebsiella pneumoniae Kbl | 2 |

EXAMPLE 34

1,600 Parts of sodium 7-(2'-D-isobornyloxycarbonylamino-2'-phenylacetamido)-3-[6''-(3''-methoxypyridazinyl)thiomethyl]-3-cephem-4-carboxylate 1''-oxide which is obtained in Example 23 are dissolved in a mixture of 20,000 parts of trifluoroacetic acid and 4,000 parts of anisole. The solution is stirred at 0°C for 15 hours and thereafter stirred at room temperature for 45 minutes. To this reaction mixture is added 300,000 parts of dry ether. The precipitates are collected by filtration to obtain 506 parts of trifluoro acetic acid salt of 7-(2'-D-amino-2'-phenylacetamido)-3-[6''-(3''-methoxypyridazinyl)thiomethyl]-3-cephem-4-carboxylic acid 1''-oxide.

Elementary analysis: Calculated for $C_{23}H_{22}O_8N_5F_3S_2 \cdot H_2O$: C, 43.46; H, 3.80; N, 11.01. Found: C, 43.69; H, 3.97; N, 10.67.

430 Parts of this product are dissolved in 5,000 parts of 5% aqueous sodium hydrogen carbonate solution. Then this solution is treated with a polystyrene resin column similarly as in Example 24 to obtain 147.2 parts of sodium 7-(2'-D-amino-2-phenylacetamido)-3-[6''-(3''-methoxypyridazinyl)thiomethyl]-3-cephem-4-carboxylate 1''-oxide. m.p.: 182° to 185°C (decomp.)

NMR spectrum ($D_2O$, 100 MC): 3.64 ppm (AB type quartet of methylene proton at the 2-position); 4.17 ppm (singlet of methoxy proton); 4.29 ppm (AB type quartet of methylene proton at the 3-position); 5.24, 5.89 ppm (doublets of protons at 6- and 7-positions, respectively)

MIC (meg./ml.)

| | |
|---|---|
| Staphylococcus aureus 209P | 0.2 |
| Staphylococcus aureus No. 87 | 5 |
| Bacillus subtilis PCI 219 | 0.1 |
| Sarcina lutea PCI 1001 | 0.05 |
| Escherichia coli NIHJ | 5 |
| Klebsiella pneumoniae | 1.56 |
| Proteus morganii Eb 54 | 20 |

EXAMPLE 35

To a solution of 1360 parts of 7-aminocephalosporanic acid and 420 parts of sodium hydrogen carbonate in 30,000 parts of water, is added 1,000 parts of sodium 6-chloro-3-pyridazinethiol 2-oxide. The solution is heated under stirring at 40°C for 30 hours. After the solution is cooled, insoluble substances are removed by filtration and the filtrate is adjusted to pH 2.0 with 10% HCl. The precipitates formed are collected by filtration and washed with water to obtain 1230 parts of 7-amino-3-[6'-(3'-chloropyridazinyl)thiomethyl]-3-cephem-4-carboxylic acid 1'-oxide.

1124 Parts of this product are added to a mixture of 9,000 parts of water and 9,000 parts of tetrahydrofuran and dissolved with addition of 303 parts of triethylamine. Separately, 994 parts of N-isobornyloxycarbonyl-D-phenylglycine and 303 parts of triethylamine are dissolved in 20,000 parts of anhydrous tetrahydrofuran. This solution is cooled to −10°C and 410 parts of isobutyl chloroformate is added thereto. This mixture is cooled to −10°C and stirred for 30 minutes to obtain a solution of mixed acid anhydrides. This solution is added in one portion to the previously prepared solution. The mixture is stirred at 5°C for 1 hour and then at room temperature for 1 hour. Most part of tetrahydrofuran is removed by distillation under reduced pressure from the reaction products. 300,000 Parts of water and 100,000 parts of ethyl acetate are added to the residue. After the mixture is shaken, the ethyl acetate layer is separated therefrom. To the aqueous layer is added 10% HCl to adjust pH 3.0. The solution is extracted with ethyl acetate. After the ethyl acetate layer is washed with water and dried, the solvent is removed by distillation. The oily substance thereby obtained is dissolved in a mixture of 12,000 parts of trifluoroacetic acid and 3000 parts of anisole. The solution is stirred at 0°C for 15 minutes and then at room temperature for 45 minutes. To this solution is added 200,000 parts of dry ether. The precipitate formed is separated by centrifuge and washed with a small amount of ether. The powder obtained is dissolved in 5000 parts of a 5% aqueous sodium hydrogen carbonate solution and passed through a polystyrene resin (Amberlite XAD-II) column to obtain 153 parts of sodium 7-(2'-amino-2'-phenylacetamido)-3-[6''-(3'-chloropyridazinyl)thiomethyl]-3-cephem-4-carboxylate 1''-oxide. m.p.: 207° to 209°C (decomp.)

Elementary analysis:
Calculated for $C_{20}H_{17}O_5N_5S_2ClNa \cdot 1\frac{1}{2}H_2O$: C, 43.13; H, 3.62; N, 12.57. Found: C, 43.48; H, 4.10; N, 12.38.

EXAMPLE 36

Various compounds are prepared according to the similar procedure as described in Example 14. The results are as shown in Table 1.

EXAMPLE 37

237 Parts of mono sodium di-hydrates of cephalosporin C is dissolved in 1000 parts of water. Separately, 80 parts of 3-methyl-6-pyridazinethiol 2-oxide and 47 parts of sodium hydrogen carbonate are dissolved in 1000 parts of water. Both solutions are admixed and the reaction is conducted at 40°C for 40 hours. After the reaction is over, insoluble subtances are eliminated from the reaction mixture by filtration. The filtrate solution is passed through a polystyrene resin (Amberlite XAD-II) column to have a reaction product adsorbed on the resin. The product is eluated with water to obtain 165 parts of sodium 7-(5'-carboxy-5'-aminovalerylamino)-3-[6''-(3''-methylpyridazinyl)thiomethyl]-3-cephem-4-carboxylate 2''-oxide. m.p.: 218° to 219°C (decomp.)
NMR ($D_2O$, 100 MC): 2.56 ppm (singlet of methyl Table 1

| No. | R | R' | Melting point (°C) | IR spectrum β-lactam (cm⁻¹) | Elementary analysis or NMR spectrum | MIC (meg./ml.) A B C D E F |
|-----|---|----|--------------------|------------------------------|--------------------------------------|------------------------------|
| 1 | pyrazolyl | methoxy-pyridazinyl-oxide | 189 to 191 (decomp.) | 1750 (KBr) | $C_{18}H_{17}O_6S_2Na \cdot 1\frac{1}{2}H_2O$ C,40.98; H,3.82; N,15.93 (calculated) C,40.88; H,3.81; N,15.76 (found) | 0.02 0.2 0.2 0.5 5 5 |
| 2 | phenyl | methyl-pyridazinyl | 171 to 173 (decomp.) | 1750 (KBr) | $C_{21}H_{19}O_5N_4S_2Na \cdot H_2O$ C,49.21; H,4.13; N,10.93 (calculated) C,49.78; H,4.54; N,10.60 (found) | <0.01 0.2 <0.01 0.05 1 2 |
| 3 | phenyl | chloro-pyridazinyl-oxide | 172 to 175 (decomp.) | 1750 (KBr) | $C_{20}H_{16}O_5N_4S_2ClNa \cdot 1\frac{1}{2}H_2O$ C,44.32; H,3.52; N,10.34 (calculated) C,44.18; H,3.62; N,9.80 (found) | 0.02 0.1 0.02 0.1 1 1 |
| 4 | phenyl | methoxy-pyridazinyl-oxide | 169 to 171 (decomp.) | 1755 (KBr) | $C_{21}H_{19}O_6N_4S_2Na \cdot 1\frac{1}{2}H_2O$ C,46.92; H,4.13; N,10.42 (calculated) C,47.37; H,4.32; N,10.50 (found) | 0.02 0.2 0.05 0.05 2 2 |
| 5 | phenoxy | methoxy-pyridazinyl-oxide | 159 to 162 (decomp.) | 1760 (KBr) | NMR (100 MC, $D_2O$) ppm 5.12 (d,6-proton) 5.72 (d,7-proton) | 0.02 0.2 0.05 0.05 2 2 |
| 6 | phenoxy | methyl-pyridazinyl-oxide (N-H) | 163 to 165 (decomp.) | 1760 (KBr) | NMR (100 MC, $D_2O$) ppm 5.14 (d,6-proton) 5.74 (d,7-proton) | <0.01 0.1 >0.01 0.1 2 5 |
| 7 | phenoxy | chloro-pyridazinyl-oxide | 171 to 173 (decomp.) | 1760 (KBr) | NMR (100 MC, $D_2O$) ppm 5.14 (d,6-proton) 5.74 (d,7-proton) | <0.01 0.2 0.05 0.2 2 10 |

NOTE)

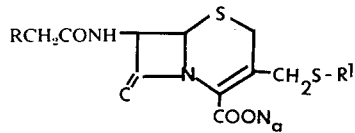

A— *Staphylococcus aureus* 209P
B— *Staphylococcus aureus* No. 87
C— *Bacillus subtilis* PCI 219
D— *Sarcina lutea* PCI 1001
E— *Escherichia coli* NIHJ
F— *Klebsiella pneumoniae* Kbl proton on pyridazine ring); 3.68 ppm (AB type quartet of methylene proton at the 2-position); 4.26 ppm (AB type quartet of methylene proton at the 3-position); 5.16, 5.57 ppm (doublets of methylene protons at the 6- and 7-positions, respectively); 7.64 ppm (AB type quartet of protons on the pyridazine ring)

EXAMPLE 38

136 Parts of 7-aminocephalosporanic acid and 42 parts of sodium hydrogen carbonate are dissolved in 1,000 parts of water. Separately, 80 parts of 3-methyl-6-pyridazinethiol 2-oxide and 47 parts of sodium hydrogen carbonate are dissolved in 1,000 parts of water. Both solutions are combined and a reaction is conducted at 40°C for 40 hours. After the solution is cooled, insoluble substances are removed by filtration. To the filtrate is added 1N-hydrochloric acid to adjust pH 2.0. 82 Parts of 7-amino-3-[1'-(3'-methylpyridazinyl) thiomethyl]-3-cephem-4-carboxylic acid 2'-oxide are obtained. m.p.: 204° to 205°C (decomp.)

NMR spectrum (D₂O, 100 MC): 2.57 ppm (singlet of methyl proton on pyridazine ring); 3.69 ppm (AB type quartet of methylene proton at the 2-position); 4.28 ppm (AB type quartet of methylene proton at the 3-position); 5.16, 5.58 ppm (doublets of methylene protons at 6- and 7-positions, respectively); 7.64 ppm (AB type quartet of protons on pyrimidazine ring)

EXAMPLE 39

To a suspension of 35 parts of 7-amino-3-[6'-(3'-methylpyridazinyl)thiomethyl]-3-cephem-4-carboxylic acid 2'-oxide in 600 parts of dimethylacetamide, is added 20 parts of 2-thienylacetyl chloride, and then the mixture is stirred at room temperature for 3 hours. Insoluble substance is removed by filtration and dimethylactamide is distilled off under reduced pressure. Water is added to the residue and the resulting precipitate is washed with ether to obtain 7-(2'-thienylacetamido)-3-[6''-(3''-methylpyridazinyl)thiomethyl]-3-cephem-4-carboxylic acid 2''-oxide. The sodium salt derived from this product is identical in all respects with that obtained in Example 24.

EXAMPLE 40

To 10,000 parts of tetrahydrofuran are added 142 parts of 2-thienylacetic acid and 101 parts of triethylamine, and the mixture is cooled to −10°C. Then, 140 parts of isobutyl chloroformate are added dropwise into this mixture. After the addition is over, the reaction mixture is brought to room temperature and stirred for 30 minutes. The thus obtained solution of mixed acid anhydride is added to a mixture of 354 parts of 7-amino-3-[6'-(3'-methylpyridazinyl)thiomethyl]-3-cephem-4-carboxylic acid 2'-oxide and 20,000 parts of dimethylacetamide. The mixture is stirred at room temperature for 2 hours. Most part of the solvent is removed under reduced pressure. The residue is dissolved in ethyl acetate. To this solution is added sodium 2-ethyl hexanoate. The precipitating substances are collected by filtration to obtain sodium 7-(2'-thienylacetamido)-3-[6''-(3''-methylpyridazinyl)thiomethyl]-3-cephem-4-carboxylate 2''-oxide. This product is completely identical with the substance obtained in Example 24.

What we claim is:
1. A compound of the formula:

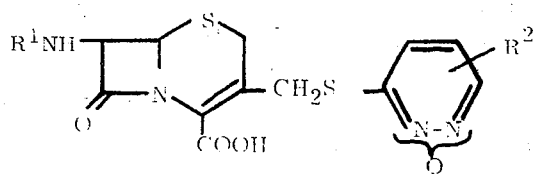

wherein R¹ represents hydrogen or:

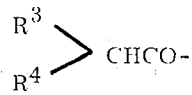

wherein R³ represents phenyl, phenoxy, 1-cyclohexenyl, thienyl, 3-amino-3-carboxypropyl, pyrazolyl, pyrazolyl substituted with chlorine or pyrazolyl substituted with methyl and R⁴ represents hydrogen or amino and wherein R² represents hydrogen, chlorine, bromine, methyl, ethyl, propyl or alkoxy having up to 8 carbon atoms, or a pharmaceutically acceptable salt thereof.

2. The compound according to claim 1, wherein the group R² is substituted at the 3-position on the pyridazine ring.

3. The compound according to claim 1, wherein R² is halogen.

4. 7-[1'-(pyrazolyl)acetamido]-3-[6''-(3''-chloropyridazinyl)thiomethyl]-3-cephem-4-carboxylic acid 1''-oxide.

5. 7-(2'-thienylacetamido)-3-[6''-(3''-chloropyridazinyl)thiomethyl]-3-cephem-4-carboxylic acid 1''-oxide.

6. 7-[1'-(4'-chloropyrazolyl)acetamido]-3-[6''-(3''-chloropyridazinyl)thiomethyl]-3-cephem-4-carboxylic acid 1''-oxide.

7. 7-(2'-amino-2'-phenylacetamido)-3-[6''-(3''-chloropyridazinyl)thiomethyl]-3-cephem-4-carboxylic acid 1''-oxide.

8. 7-(phenylacetamido)-3-[6'-(3'-chloropyridazinyl)thiomethyl]-3-cephem-4-carboxylic acid 1''-oxide.

9. 7-(phenoxyacetamido)-3-[6'-(3'-chloropyridazinyl)thiomethyl]-3-cephem-4-carboxylic acid 1''-oxide.

10. The compound according to claim 1, wherein R² is alkyl.

11. 7-(2'-thienylacetamido)-3-[6''-(3''-methylpyridazinyl)thiomethyl]-3-cepham-4-carboxylic acid 2''-oxide.

12. 7-[1'-(pyrazolyl)acetamido]-3-[6''-(3''-methylpyridazinyl)thiomethyl]-3-cephem-4-carboxylic acid 2''-oxide.

13. 7-[1'-(3',5'-dimethylpyrazolyl)acetamido]-3-[6''-(3''-methylpyridazinyl)thiomethyl]-3-cephem-4-carboxylic acid 2''-oxide.

14. 7-(phenylacetamido)-3-[6''-(3''-methylpyridazinyl)thiomethyl]-3-cephem-4-carboxylic acid 2''-oxide.

15. 7-(phenoxyacetamido)-3-[6''-(3''-methylpyridazinyl)thiomethyl]-3-cephem-4-carboxylic acid 2''-oxide.

16. The compound according to claim 1, wherein $R^2$ is alkoxy.

17. 7-amino-3-[6'-(3'-methoxypyridazinylthiomethyl)]-3-cephem-4-carboxylic acid 1'-oxide.

18. 7-(2'-thienylacetamido)-3-[6''-(3''-methoxypyridazinylthiomethyl)]-3-cephem-4-carboxylic acid 1''-oxide.

19. 7-(5'-amino-5'-carboxyvalerylamido)-3-[6''-(3''-methoxypyridazinylthiomethyl)]-3-cephem-4-carboxylic acid 1''-oxide.

20. 7-amino-3-[6'-(3'-n-butoxypyridazinylthiomethyl)]-3-cephem-4-carboxylic acid 1'-oxide.

21. 7-(2'-thienylacetamido)-3-[6''-(3''-n-butoxypyridazinylthiomethyl)]-3-cephem-4-carboxylic acid 1''-oxide.

22. 7-amino-3-{6'-[3'-(2''-ethylhexyloxy)-pyridazinylthiomethyl]}-3-cephem-4-carboxylic acid 1'-oxide.

23. 7-(2'-thienylacetamido)-3-{6''-[3''-(2''-ethylhexyloxy)pyridazinylthiomethyl]}-3-cephem-4-carboxylic acid 1''-oxide.

24. 7-(2'-thienylacetamido)-3-[6''-(3''-ethoxypyridazinyl)thiomethyl]-3-cephem-4-carboxylic acid 1''-oxide.

25. 7-[2'-isobornyloxycarbonylamino-2'-(1'''-cyclohexenyl)acetamido]-3-[6'''-(3'''-methoxypyridazinyl)thiomethyl]-3-cephem-4-carboxylic acid 1''-oxide.

26. 7-(2'-D-amino-2-phenylacetamido)-3-[6''-(3''-methoxypyridazinyl)thiomethyl]-3-cephem-4-carboxylic acid 1''-oxide.

27. 7-[1'-(3',5'-dimethylpyrazolyl)acetamido]-3-[6''-(3''-methoxypyridazinyl)thiomethyl]-3-cephem-4-carboxylic acid 1''-oxide.

28. 7-(1'-pyrazolyl)acetamido-3-[6''-(3''-methoxypyrimidazinyl)thiomethyl]-3-cephem-4-carboxylic acid 1''-oxide.

29. 7-(phenylacetamido)-3-[6''-(3''-methoxypyridazinyl)thiomethyl]-3-cephem-4-carboxylic acid 1''-oxide.

30. 7-(phenoxyacetamido)-3-[6''-(3''-methoxypyridazinyl)thiomethyl]-3-cephem-4-carboxylic acid 1''-oxide.

31. 7-(2'-thienylacetamido)-3-[6''-(pyridazinyl)thiomethyl]-3-cephem-4-carboxylic acid 2''-oxide.

32. A compound according to claim 1 wherein $R^1$ is hydrogen.

33. A compound according to claim 1 wherein $R^1$ is thienylacetyl.

34. A compound according to claim 1 wherein $R^1$ is hydrogen or thienylacetyl.

35. A compound according to claim 1, wherein $R^2$ represents hydrogen, chlorine, methyl, or alkoxy of up to 8 carbon atoms.

36. A compound according to claim 35 wherein $R^2$ represents hydrogen, chlorine, methyl, methoxy, ethoxy, propyloxy, butyloxy or octyloxy.

37. A compound according to claim 1, wherein $R^2$ is chlorine.

38. A compound according to claim 1, wherein $R^2$ is methyl.

39. A compound according to claim 1, wherein $R^2$ is alkoxy having up to 8 carbon atoms.

* * * * *